United States Patent [19]
Alderson

[11] 3,924,181
[45] Dec. 2, 1975

[54] TEST CIRCUITRY EMPLOYING A CYCLIC CODE GENERATOR

[75] Inventor: Gary E. Alderson, Play del Rey, Calif.

[73] Assignee: Hughes Aircraft Company, Culver City, Calif.

[22] Filed: Oct. 16, 1973

[21] Appl. No.: 406,985

[52] U.S. Cl. .................... 324/73 R; 235/153 AC
[51] Int. Cl.² .................................. G01R 15/12
[58] Field of Search ............ 235/153 AC; 324/73 R

[56] References Cited
UNITED STATES PATENTS
3,716,783  2/1973  Deering .............................. 324/73
3,790,885  2/1974  James .................................. 324/73

OTHER PUBLICATIONS
Peterson, W. W., "Error-Correcting Codes", The MIT Press, MIT, 1961, pp. 115–118.

*Primary Examiner*—John Kominski
*Assistant Examiner*—Rolf Hille
*Attorney, Agent, or Firm*—W. H. MacAllister, Jr.; J. M. May

[57] ABSTRACT

Test circuitry is disclosed for testing a circuit module with a high probability of error detection. The circuitry is relatively simple and is therefore readily adaptable for integration with the module to be tested thereby providing effective fault detection capability at the system level. A pseudo-random pattern generator provides the logic to be tested with a series of parallel test inputs. The output from the logic at the end of each cycle within the test sequence is multiplexed into a sequential bit stream which forms the input to a cyclic code generator. After the test sequence has been run for a predetermined number of cycles, the output of the cyclic code generator is compared with a hardwired constant representative of the output of a good unit. Inasmuch as the cyclic code generator is not reset between cycles, two levels of output data reduction are provided — within a single test cycle and within a sequence of cycles. If the comparison indicates a mismatch, an error signal is output.

1 Claim, 3 Drawing Figures 3,924,181

TEST CIRCUITRY EMPLOYING A CYCLIC CODE GENERATOR

The invention claimed herein was made in the course of a contract with the Department of the Navy.

FIELD OF THE INVENTION

This invention is directed to circuitry for the testing of electronic circuit modules and more particularly to built-in test circuitry suitable for subjecting a complex circuit module having a large number of inputs and outputs to an easily implemented testing sequence having a high probability of detecting a failed module.

CROSS-REFERENCE TO RELATED APPLICATIONS

The present invention represents and alternative approach to some of the objectives discussed in the application of Richard F. Stewart, entitled "Circuit Tester with Encoded Output," filed concurrently herewith and assigned to the same assignee.

SUMMARY OF THE INVENTION

Prior Art

It has long been recognized that, in the testing of complex circuitry such as that provided by large scale integration wherein a large number of inputs are provided and the internal circuitry is itself inaccessible, it is impossible to apply a sequence of test patterns having every possible input combination and then compare all the respective responses to those of a known "good" reference device.

U.S. Pat. No. 3,614,608 provides a partial solution to that problem by providing a random number generator as the source of the test inputs. The tester disclosed in that patent employs "reference logic" which may be either a logic simulator or good logic unit of the type under test and compares each corresponding output pin of the logic under test with that of the reference logic and supplies to the corresponding input pins of the logic under test and those of the reference logic identical signals from the random number generator. Although such a tester may very well be useful in the manufacturing of large-scale integrated circuit packages, it has the disadvantage that the testing circuitry (which of necessity includes this reference logic) is even more complex than the circuit to be tested and therefore is quite unsuitable for integration with the module to be tested.

U.S. Pat. No. 3,651,315 in the name of Arthur A. Collins utilizes a pseudo-random number generator, but it is utilized not as a free-running input signal generator, but as a "transfer function " between the output of the unit under test and the input to the unit. Presumably, the fact that output is fed back to the input alleviates the necessity for comparing the tested unit's output with that of a known good unit each time the input is changed and therefore permits infrequent sampling of the output from unit under test. It would appear that the invention was directed to the problem of the manufacture of electric components wherein a particular circuit must be tested at a high rate of speed under the control of an electronic data processor which has and input/output rate slower than that required to fully exercise the unit under test. It would not appear that that invention is particularly well-suited for integration with a particular circuit module in order to provide a built-in test capability.

OBJECTS

Accordingly, it is one object of the present invention to provide relatively simple test circuitry adapted for integration with the circuit module to be tested.

It is a second object of the present invention to provide test circuitry having a high statistical probability of detecting a failure present in a circuit module undergoing test.

It is a third object of the present invention to provide test circuitry dispensing with the need for addressable data storage.

THE PRESENT INVENTION

The invention which satisfies these and other objects may be briefly summarized, as follows:

The logic circuit to be tested is provided with an input multiplexer which switches between the normal input and a test signal input which provides a predetermined sequence of parallel inputs to the logic under test. The output of the logic, which may either be the normal output points or specially provided test points within the logic, is multiplexed into a serial input to a cyclic code generator. After a predetermined number of test signal input cycles have taken place, the output of the cyclic code generator represents in condensed ("encoded") form the various outputs of the various test cycles of the logic unit. This encoded representation is then compared with a hardwired constant representative of the encoded output of a good unit and, if a mismatch has occurred, an error signal is generated.

BRIEF DESCRIPTION OF THE DRAWINGS

For a better understanding of the construction and function of the test circuitry of the present invention, reference is made of the drawings and to the following detailed description of the preferred embodiment in which.

DETAILED DESCRIPTION OF THE PREFERRED EMBODIMENT

Introduction

The test procedure implemented by the preferred embodiment of the present invention is similar to the prior art test technique used in the static testing of digital logic in that it compares output patterns from the logic under test obtained as a result of stimulating the logic with known input patterns and then comparing the respective outputs with the known responses of fault-free modules. If test circuitry implementing such a test procedure were to be integrated with each unit-replaceable module, testing on the system level would then be merely determining which modules have "error" outputs from their respective built-in test circuitry. However, with modern large-scale integration techniques, it is possible to manufacture unit replaceable modules having hundreds of inputs and outputs — a test that uses all possible input patterns and compares on a bit-by-bit basis all resultant outputs would be impossible complex and expensive. To overcome these practical problems of complexity and expense, the test procedure implemented by the present invention derives a single encoded data word which is the encoded representation of data from many successive output cycles corresponding to a predetermined, pseudo-random sequence of input cycles. Using simple comparison circuitry, this resultant encoded data word may then be compared with the hardwire constant resulting in an error signal, if the two are not identical.

Figure 1:
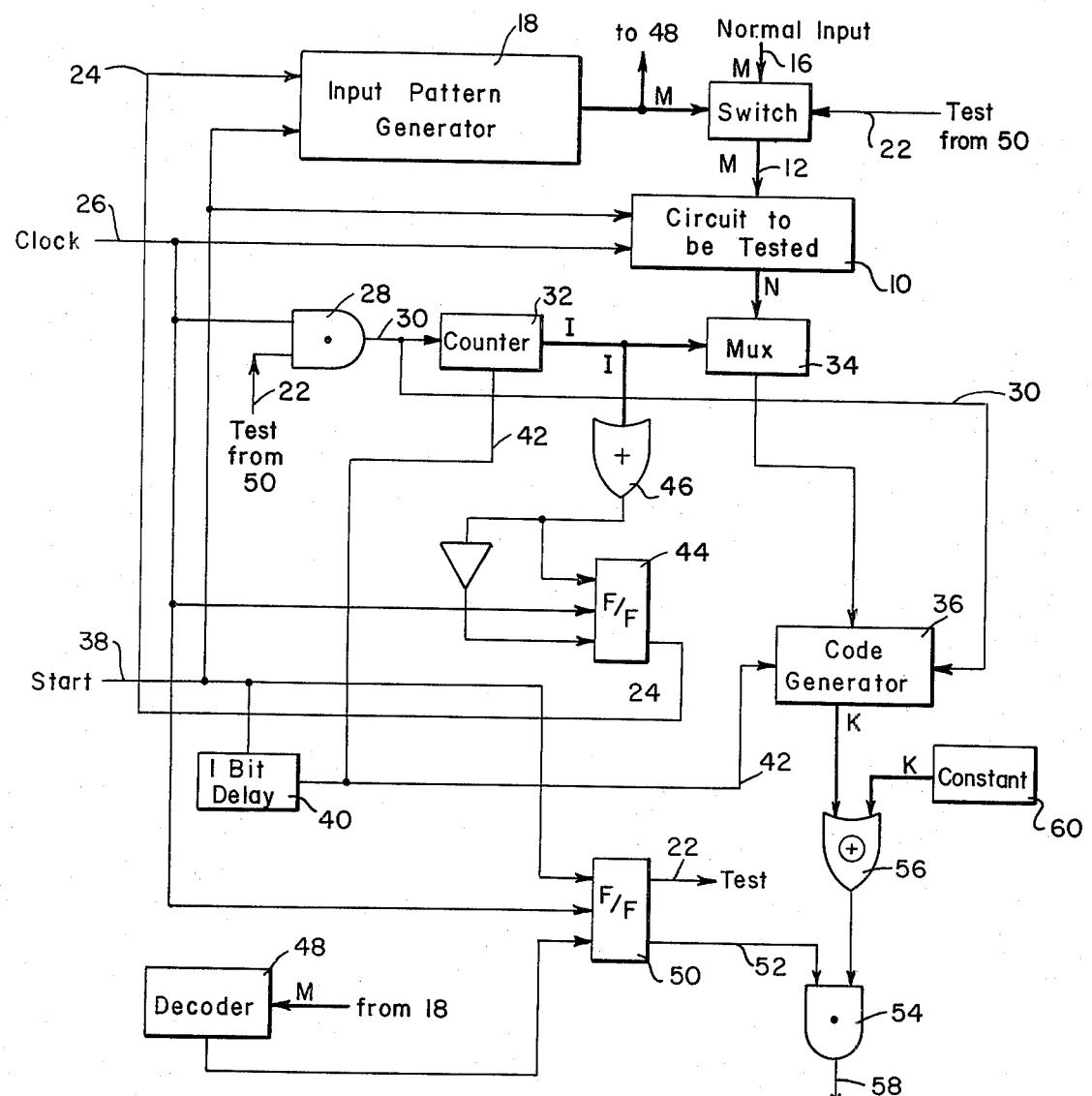
FIG. 1 illustrates in functional block diagram form a logic module integrated with built-in test circuitry constructed in accordance with the present invention.

Referring now with greater particularity to FIG. 1 wherein the present invention is illustrated in functional block diagram form, it may be seen that the circuit module to be tested 10 has M inputs 12 and N outputs 14. The M inputs may be either the normal inputs 16 to the module or M inputs provided by a "pseudo-random" input pattern generator 18, as determined by the setting of an input switch 20 under the control of TEST control signal 22.

Input pattern generator 18 may be one of any number of types, it only being required that it generate a predetermined but statistically "randomly" distributed sequence of M bit input patterns in response to a NEXT PATTERN control signal 24. Pattern generator 18 may be, for example, a cyclic code generator having M stages. A set of random patterns will generally exercise logic as well as a set of preselected patterns. In these case, a considerable amount of hardware can be saved by using a pseudo-random pattern generator instead of a read only memory. The numbers so produced are random in each bit position. Although we cannot design this type of generator to produce a preselected set of patterns, the patterns are known, once the design is given (hence, the name pseudo-random). The flip-flops in the pattern generator are set or cleared to establish initial pattern generator states. If part of some memory accessible to the unit under test were to contain known patterns, then these patterns may be used for test purposes. It is assumed that such a memory has been tested and found fault-free (possibly by using parity checking) before the patterns are applied to the unit under test.

An external CLOCK 26, which is assumed to be also an input to the circuit module 10, is ANDed with the aforesaid TEST control signal 22 by means of AND-gate 28 to form a TEST CLOCK signal 30. This TEST CLOCK signal increments counter 32, the output of which controls multiplexer 34. This multiplexer in turn selects which of the bits of circuit output 14 is to be applied to the cyclic code generator 36. Cyclic code generator 36 is also under the control of the aforesaid TEST CLOCK signal 30 and may be initialized by means of an external START pulse 38 which, delayed by means of delay gate 40 to form a RESET pulse 42, is applied simultaneously to the cyclic code generator 36 and to the aforesaid counter 32. Flip-flop 44 provides the aforesaid NEXT PATTERN signal 24 each time counter 32 cycles through zero, as determined by zero decoder OR-gate 46. It is assumed that the RESET pulse 42 initially sets counter 32 to a non-zero state.

The M bits of output from pseudo-random input pattern generator 18 are also provided to a last pattern decoder 48 which, upon detecting the last pattern in a test sequence having been generated by the pattern generator, causes a flip-flop 50 to output an END-OF-TEST signal 52 and to disable TEST signal 22.

END-OF-TEST signal 52, in turn, enables AND-gate 54 to accept the output from comparator 56 (an exclusive OR-gate) thereby providing an ERROR signal 58, if the final output of cyclic code generator 36 is not equal to the complement of a hardwired constant 60. In order to protect against a stuck-at-good condition in gates 54 and 56, each may be duplicated and the respective outputs OR'd together.

Before a test pattern checker can be enabled to verify output patterns, the logic module to be tested must be set to a known state. Procedures that can help provide the initialization needed for good fault isolation are given below:

1. Local logic module initialization using set/reset lines derived from START pulse 38. The best method for initialization with regard to testing is to bring out all set and clear lines for registers, counters, etc. In most cases, this approach will not require too many lines, circuits, or terminals. Noise immunity is improved with buffering of set or reset lines by gates or flip-flops on each logic module. The set or reset lines may be driven by a central logic module providing built-in test control.

2. Local initialization using input patterns. A read only memory or pseudo-random pattern generator located on each logic module could be used to provide patterns for initialization. With hardware designed for initialization, this could be as simple as controlling clear or set lines to each memory element. The idea is to minimize the use of patterns coming from outside a logic module for initializing that module. Software programs exist for finding a set of patterns (a homing sequence) to initialize a network to a specified state. Such programs are not needed for the built-in test procedures described herein because we need only put the sub-unit into a known state and not a particular or specified state. In addition, the program results in a particular input sequence which means that a simple pseudo-random pattern generator could not be used.

3. Use of test pattern checkers for initialization. Suppose that to set a particular submodule to a known state, we use M patterns from some other submodule. Many of the bits in these patterns may be known for the fault-free case and, if checked, could be used to initialize the submodule. For example, assume that $r_0 \ldots r_J$ are known for all M patterns and that $r_{J+1} r_{J+2} \ldots r_N$ are unknown. Isolation capabilities are maintained, if the test pattern checker in submodule 1 checks $r_0 r_1 \ldots r_J$ for M patterns. The disadvantage of the scheme is that the test pattern checker is more complicated.

Figure 2:
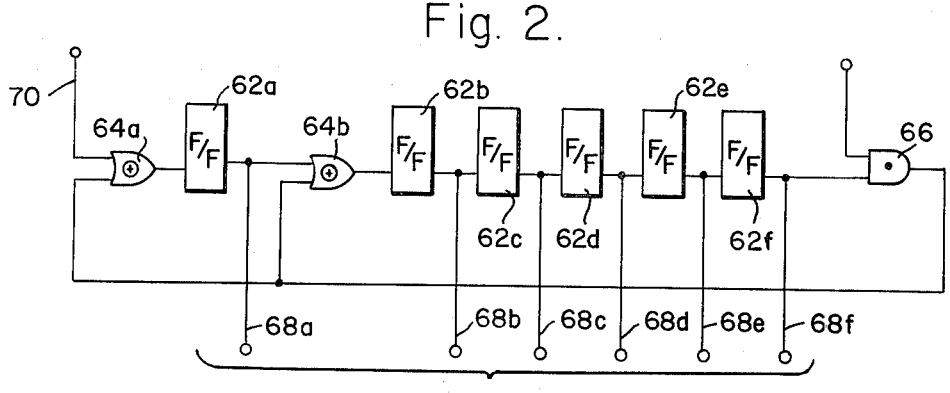
FIG. 2 illustrates a particular type of cyclic code generator useful in the construction of the test circuitry of FIG. 1.

Referring now to FIG. 2 wherein a typical six-stage cyclic code generator based on the primitive generator polynomial $1 + X + X^6$ is illustrated, it may be seen that such a generator comprises six flip-flops 62a through 62f, two exclusive OR-gates 64a and 64b, and a control AND-gate 66. The output 68 of the cyclic code generator may either be in parallel form on lines 68a through 68f or in serial form via line 68f only. In operation, data to be encoded is input (high order bits first) via input line 70 to exclusive OR-gate 64a where it is added modulo 2 by means of exclusive OR-gate 64a to the output of sixth flip-flop 62f (assuming control gate 66 is enabled) and input to first flip-flop 62a. The output from sixth flip-flop 62f is also added modulo 2 to the output of first flip-flop 62a prior to its input to second flip-flop 62b. Inasmuch as the coefficient for the second, third, fourth, and fifth powers of X in the aforesaid primitive generator polynomial are zero, no exclusive OR-gates are required between those respective flip-flops but, rather, they may be directly serially connected.

Figure 3:
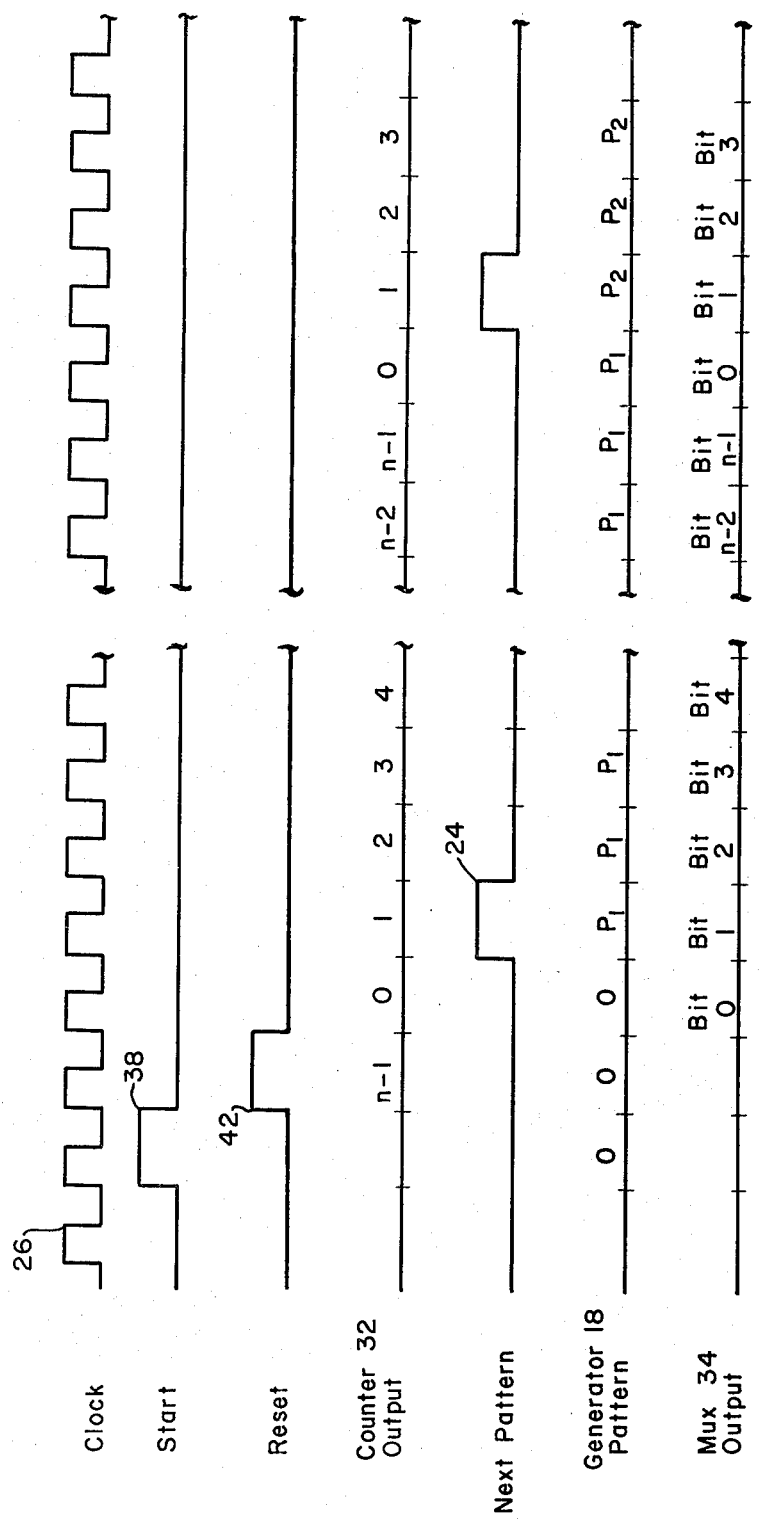
FIG. 3 illustrates various key timing signals and outputs used in the operation of the circuitry of FIGS. 1 and 2.

Referring now to FIG. 3 wherein various key timing signals and other outputs are illustrated, it may be seen that the basic timing is supplied by an external CLOCK signal 26. START pulses 38 is another external signal and is assumed to be in synchronization with a particular cycle of the aforesaid CLOCK signal. RESET signal 42 is derived by the internal 1-bit delay 40 and occurs exactly one clock cycle after START pulse 38.

Counter 32, in response to RESET pulse 42, assumes a non-zero state (N-1, as indicated in FIG. 3) and thereafter successively assumes the values 0, 1, 2, ..., N–1, which sequence is then repeated until the last pattern is decoded by decoder 48 and the test sequence thereby terminated. NEXT PATTERN pulse 24 is generated by decoder 46 and flip-flop 44 each time counter 32 cycles through zero. The first such NEXT PATTERN pulse causes a first pattern "$P_1$" to be output by generator 18, the second NEXT PATTERN pulse, pattern $P_2$, and so on.

One clock after pattern $P_1$ is applied to the input 12 of the circuit to be tested, the first bit "Bit 1" of the corresponding output pattern is clocked into code generator 36 from multiplexer 34. In the ensuing N–1 clock cycle, Bits 2 through 0 are successively input to this code generator, in accordance with the state of the counter 32. This operation is then repeated until the end of the test sequence.

The use of cyclic or polynomial codes in providing data reduction will now be discussed. To illustrate this process, suppose that for a given initialization and input test pattern the output pattern of a logic module is given by
$$N = 101001010010.$$
Assume that, as a result of specifications on detection probability and the amount of built-in test hardware allowed, the polynomial $1 + X + X^6$ was chosen to generate the cyclic code (i.e., it is the generator polynomial). To derive the cyclic code for N, we first write N as a polynomial in X by using the data bits of N as the coefficients $N = 101001010010$
$\Rightarrow 1 + 0X + 1X^2 + 0X^3 + 0X^4 + 1X^5 + 0X^6 + 1X^7 + 0X^8 + 0X^9 + 1X^{10} + 0X^{11}$
$= 1 + X^2 + X^5 + X^7 + X^{10}$ the next step is to divide $1 + X^2 + X^5 + X^7 + X^{10}$ by $1 + X + X^6$ to determine the remainder.

$$\frac{1 + X^2 + X^5 + X^7 + X^{10}}{1 + X + X^6} = X + X^4 + \frac{1 + X + X^4}{1 + X + X^6}$$

(Note that is performing the division, addition is done module 2.) The cyclic code is defined as the binary digits corresponding to the coefficients of the remainder $1 + X + X^4$.

Cyclic code = 110010

Thus, checking the validity of N is reduced to comparing the code 110010 to a predetermined correct value.

From the above discussion, it is apparent that, for an error in the pattern N to go undetected, the remainder after dividing the polynomial corresponding to N by $1+X+X^6$ would have to be the same as the remainder obtained for the correct value of N. The error detection capability of various generator polynomials, including the one used in the above example, is given in Table 1.

The degree of the generator polynomial and the number of X terms in a generator polynomial determine the number of flip-flops and exclusive-OR-gates needed to implement a cyclic code generator. For example, as shown in FIG. 2, the cyclic code generator for $1 + X + X^6$ consists of six flip-flops, two exclusive OR-gates, and one AND-gate.

TABLE 1

CYCLIC CODE PARAMETERS

| Generator Polynomial | Number of Check Bits | Error Detection Probability |
|---|---|---|
| $1 + X + X^4$ | 4 | 94% |
| $1 + X^2 + X^5$ | 5 | 97% |
| $1 + X + X^6$ | 6 | 98% |
| $1 + X^3 + X^7$ | 7 | 99% |

Note that the present invention has the feature that one cyclic code generator such as shown in FIG. 2 can provide two levels of data reduction, as follows:

STEP 1: A single input test pattern is applied to the logic module. The corresponding logic module outputs and selected internal test points are given by $r_{1,0} r_{1,1} r_{1,2} \ldots r_{1,N-1}$.

STEP 2: The counter/multiplier combination is used to select one bit at a time, $r_{1,0}$ through $r_{1,N-1}$. The operation requires N clocks. As each bit is selected, it is inserted into the cyclic code generator. After N clocks, the L bit number stored in the code generator is the cyclic code for the N bits $r_{1,0} r_{1,1} \ldots r_{1,N-1}$.

STEP 3: The second input test pattern is applied to the logic module. The corresponding logic module outputs and selected internal test points are given by $r_{2,0} r_{2,1} \ldots r_{2,N-1}$.

STEP 4: The counter/multiplexer combination is used to select one bit at a time, $r_{2,0}$ through $r_{2,N-1}$. As each bit is selected, it is inserted into the cyclic code generator. After N, clock pulses, the L bit number stored in the code generator is the cyclic code for the two patterns combined, that is for $r_{1,0} r_{1,1} \ldots r_{1,N-1} r_{2,0} r_{2,1} \ldots r_{2,N-1}$.

STEP 5: A third input test pattern is applied to the logic module, etc.

Although a preferred embodiment of the invention has been described, modifications and improvements will occur to those skilled in the art, in accordance with the requirements of the particular system wherein the subject matter of the invention is to be employed.

What is claimed is:

1. Test circuitry adaptable for integration with a circuit having a M-bit input and N-bit output to be tested, said test circuitry and said circuit forming a single replaceable unit within a larger hardware system and comprising:

means for providing a predetermined sequence of T-Test patterns, each of M-bits for application to said M-bit input;

a parallel to serial multiplexer for converting the M-bits of circuit output to a single serial bit stream;

a cyclic code generator responsive to the serial output of said multiplexer for encoding a single K-bit number representative of T successive N-bit output patterns from said circuit, K being equal to or greater than 4 and less than T times N;

a hardwired constant representative of the output from a good circuit; and a comparator for comparing said K-bit number with said hardwired constant.

* * * * *